United States Patent [19]
Mortimer

[11] 3,745,671
[45] July 17, 1973

[54] AUTOMATIC MONITORING PROCEDURAL ITEMS IN A TRAINING DEVICE

[75] Inventor: Charles P. L. Mortimer, Binghamton, N.Y.

[73] Assignee: The Singer Company, New York, N.Y.

[22] Filed: Mar. 15, 1971

[21] Appl. No.: 123,958

[52] U.S. Cl. ............................................. 35/12 R
[51] Int. Cl. ........................................... G09b 9/08
[58] Field of Search .................. 35/12 R, 12 W, 11, 35/9 R, 9 A, 8 R

[56] References Cited
UNITED STATES PATENTS
3,508,346  4/1970  Norman et al. ..................... 35/12 W
3,405,457  10/1968  Bitzer ................................. 35/9 R
2,894,335  7/1959  Florea ............................... 35/12 W Primary Examiner—Wm. H. Grieb
Attorney—Francis L. Massell, William Grobman and Charles S. McGuire

[57] ABSTRACT

In a training device, such as an aircraft simulator, means for automatically displaying a list of tasks to be performed by a trainee in carrying out a designated procedural training item, indicating actual execution of each task and indicating any task performed in other than a predetermined sequence. The tasks associated with each item may be listed on slides, the appropriate slide being projected for viewing on a display screen having associated lights adjacent each task listing. The lights are turned on as the tasks are performed and blink on and off if a task is performed out of sequence. Alternate constructions disclosed include CRT displays and changing the color of the task name on the display to indicate performance or improper sequence.

7 Claims, 7 Drawing Figures

AUTOMATIC MONITORING PROCEDURAL ITEMS IN A TRAINING DEVICE

This invention relates to training in general and more particularly to apparatus which provides an instructor with information concerning trainee performance.

In training devices, such as aircraft simulators, it is important for an instructor to be able to evaluate trainee performance during the execution of procedural items. Generally this has been done by providing the instructor with repeaters, status indicators, and/or providing a hard copy printout of a performance evaluation. These methods of providing such information present certain problems. A series of indicators on a display panel are difficult to scan and correlate and a hard copy print is usually only available after the procedure has been completed. The present application discloses apparatus which will display to the instructor immediately, and in an easily understandable manner, information concerning trainee performance of procedural items.

It is the object of this invention to provide apparatus to facilitate instructor evaluation of student performance during the execution of procedural items in a trainer.

It is also an object to provide apparatus which will do so by providing a visual display of the tasks to be performed, their order of execution and errors in order of execution.

Another object is to provide such apparatus which will be particularly useful in aircraft simulators.

Other objects of the invention will in part be obvious and will in part appear hereinafter.

The invention accordingly comprises the apparatus embodying features of construction, combination of elements and arrangement of parts as exemplified in the following detailed disclosure and the scope of invention will be indicated in the claims.

For a fuller understanding of the nature and objects of the invention reference should be had to the following detailed description taken in connection with the accompanying drawings, in which.

Procedural items may be of many types. For purposes of simplicity they may be classed as normal procedures and procedures in response to malfunctions. In a flight simulator, examples of the first type would be takeoff procedures, landing procedures, climbing, turning, etc. Examples of the latter type would be engine failure, fire, loss of pressurization, etc. For each item a definite procedure has been established which must be followed if the desired result is to be achieved.

To implement the system each procedural item must be assigned a priority. Since proper execution of procedures in response to malfunctions is normally more important than normal procedures, malfunction items would normally be assigned the highest priorities and the normal functions lower priorities. (It is assumed the instructor may only monitor one item at a time, as will be explained below.) For the sake of explaining the principles involved in the invention only three exemplary items will be used in the present application. These will be take off, turning, and engine loss due to carburetor icing.

Figure 1:
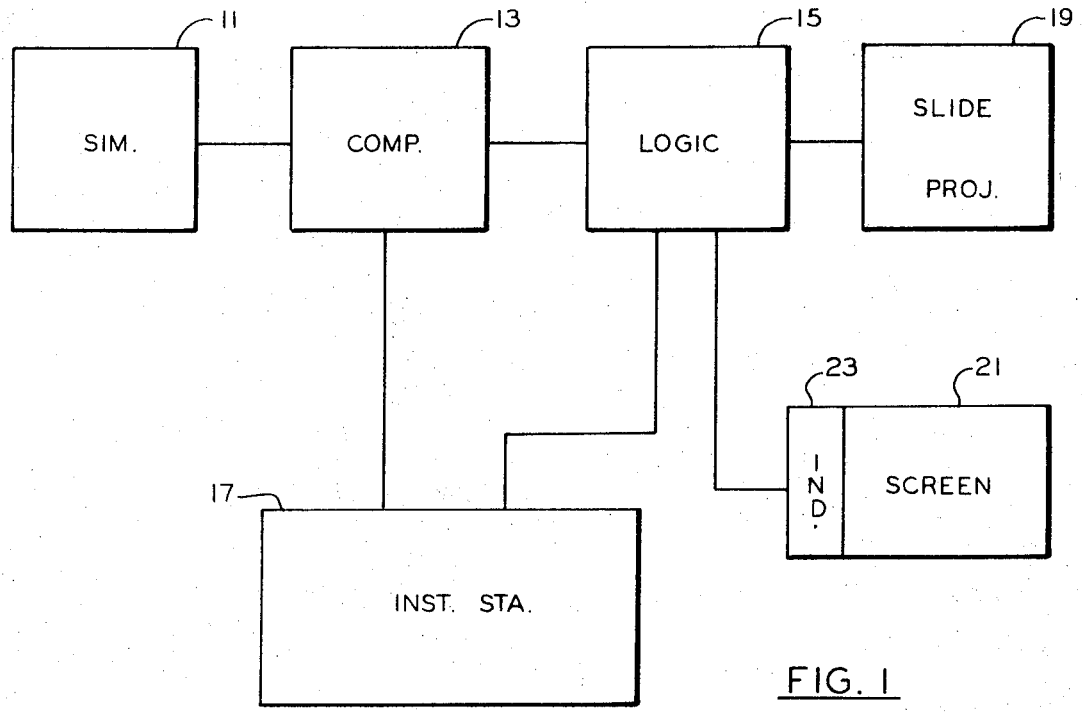
FIG. 1 is a block diagram of a first embodiment of the invention.

The procedures to be followed and the priority assigned for each will be assumed to be as follows:

1. Loss of engine due to carburetor icing:
   a. stick forward
   b. turn on deicing
   c. restart engine
2. Take off:
   a. check right magneto
   b. check left magneto
   c. apply power
3. Turn left:
   a. stick left
   b. left rudder depressed
   c. stick back FIG. 1 shows a simulator 11 and its associated computer 13. Indications of control and switch movements which occur in the cockpit will be sent to the computer 13 to be used in flight, engine and other equations. Thus, an indication of each of the actions required in each procedural item will be available in the computer when performed and may be provided to logic block 15. Also connected to logic block 15 is an instructors station 17. The instructor may select the procedure to be observed at which time a command will be sent to logic block 15 which will in turn activate slide projector 19 and select the proper slide. One slide for each procedural item containing a list such as shown on FIG. 2 will be stored in projector 19 which is a random access projector. Projector 19 will project this slide onto screen 21 which the instructor may view. Next to screen 21 is a panel 23 containing a series of lights corresponding to the list on the slides as shown on FIG. 2. These lights are controlled by logic block 15 as will be explained below. As the trainee performs the required functions, an indication from computer 13 will be sent to logic block 15 which will cause the proper lights on panel 23 to light. The instructor will select only normal procedures to observe. If a malfunction occurs a command from computer 13 will override the normal procedure as will be described below.

Figure 3:
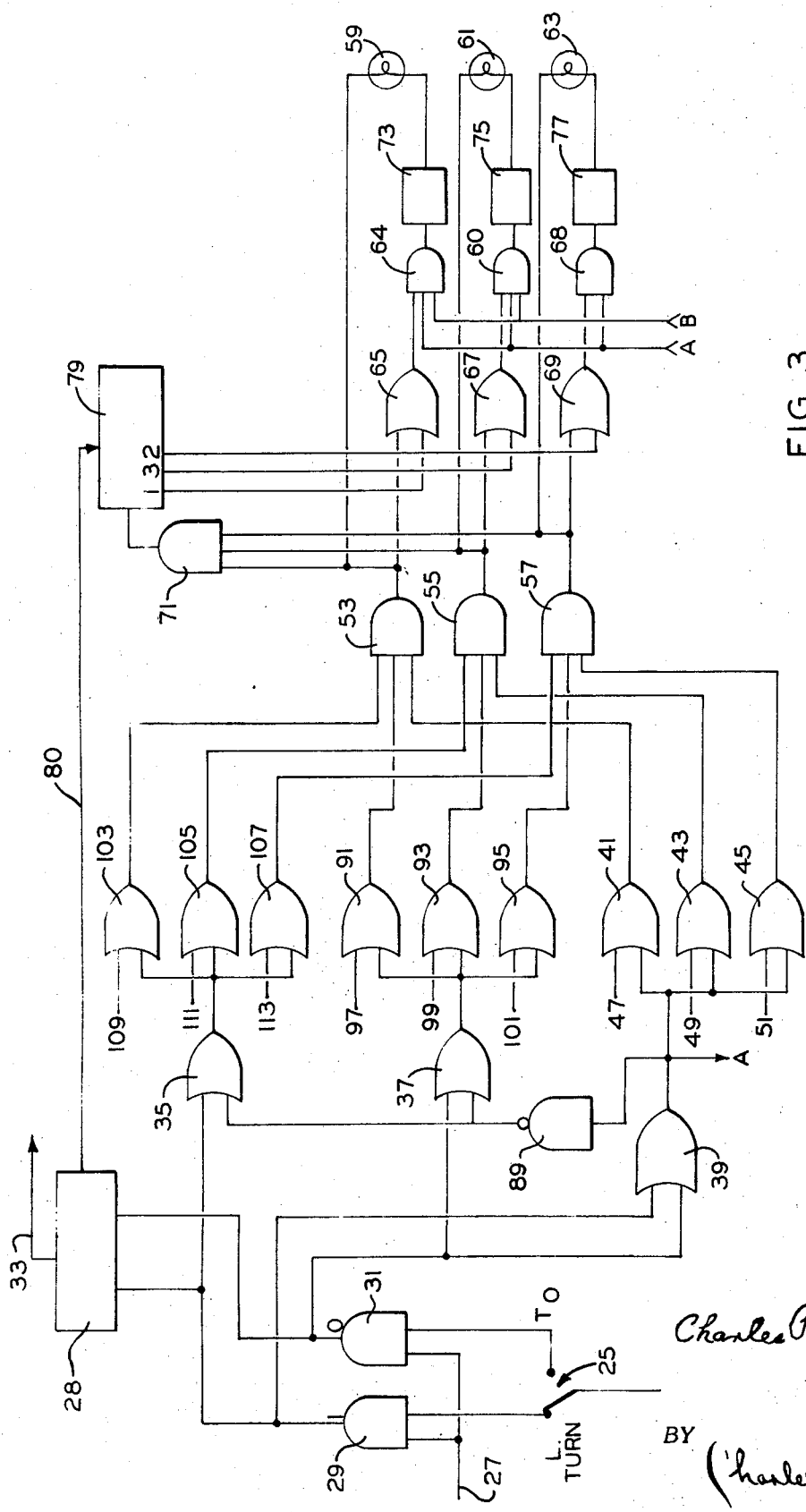
FIG. 3 is a logic diagram of the logic used in the embodiment of FIG. 1.

FIG. 3 shows a possible construction of logic block 15. Switch 25 represents one of a number of selection switches located at the instructor station and is used to select the procedure to be observed (in the present example, take off or left turn). Line 27 comes from the computer and will have a signal on it when an engine loss due to icing occurs. Block 28 contains decoding logic for two binary digits to provide a signal to projector 19 of FIG. 1. The coded signal input to block 28 is obtained from OR gates 29 and 31. If the output of gate 29 is considered a binary 1 and that of gate 31 a binary zero, then selection of left turn on the instructors switch will result in a one output from gate 29, and selection of takeoff an output of one from gate 31. If a malfunction occurs both gates will have inputs from line 27 and an output of a binary one will result from both gates 29 and 31. In table form the coded data will be:

| Procedure | Binary | Decimal |
|---|---|---|
| Left Turn | 10 | 1 |

| | | |
|---|---|---|
| Take Off | 01 | 2 |
| Engine Loss | 11 | 3 |

Line 33 then will provide a decoded output to the projector and the proper slide will be selected.

Figure 2:
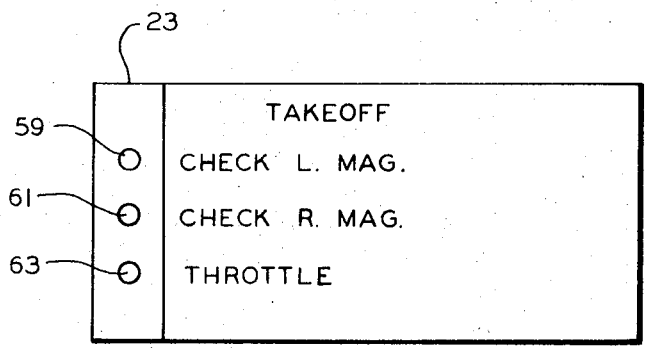
FIG. 2 is a view of the display associated with FIG. 1.

The remaining logic is used to control the lamps on panel 23 of FIGS. 1 and 2. AND gates 35, 37 and 39 are used to select the procedure for which the lamps are to be controlled. Gate 39 will have an output when inputs from both gates 29 and 31 (indicating engine failure) are present. The output from gate 39 is provided as one input to gates 41, 43 and 45. Their second inputs, on lines 47, 49 and 51 respectively, will be the stick forward, deicing on, and engine start commands from computer 13 of FIG. 1. Thus, as these actions are performed by the pilot, outputs will appear on the gates 41, 43 and 45. These outputs provide, respectively, one input to OR gates 53, 55 and 57, which will in turn have outputs whenever an input is present. The outputs of gates 53, 55, 57 are connected to lamps 59, 61 and 63 and also provide one input to AND gates 65, 67 and 69. They also provide inputs to OR gate 71. AND gates 65, 67, and 69 provide inputs to flasher circuits 73, 75 and 77, an exemplary construction of one such circuits being shown in detail on FIG. 4. The output of gate 71 is an input to latching counter 79 which provides the second set of inputs to gates 65, 67 and 69.

When the engine loss occurs gates 29 and 31 will both have outputs causing AND gate 39 to have an output. This will enable gates 41, 43 and 45. If the pilot follows the proper procedure and pushes his stick forward a signal will appear at 47 and an output from gate 41 will result. This output will cause an output at gate 53 which will cause gate 71 to have an output and counter 79 (which was reset via line 80 when the malfunction occurred) will count "1" and have an output on line "1" line which will enable gate 65. The output from gate 53 will be ANDED with the "1" output from the counter and gate 65 will have an output to OR gate 65 which is connected to flasher circuit 73.

Figure 4:
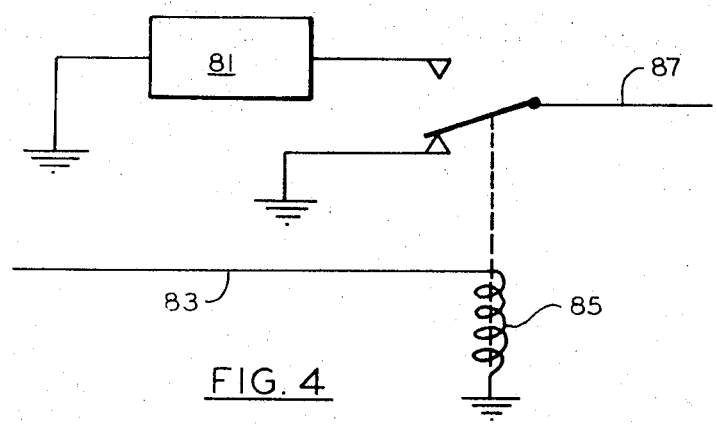
FIG. 4 is a circuit diagram of the flasher of FIG. 3.

Referring now to FIG. 4, block 81 is a flasher mechanism similar to the type used in display lighting, Christmas tree lights, etc. Line 83 is the input line from the preceding gate (i.e. gate 64) and goes to relay coil 85. If an input is present coil 85 will be energized and the output line 87 will be connected to ground. If no input signal is present, the relay coil 85 will not energize and the output line 87 will be connected to flasher mechanism 81.

Thus, the input to block 73 from gate 64 will cause block 73 output to be grounded, thus grounding one side of lamp 59. The output from gate 53 will provide a voltage to the other side of lamp 59 and it will be lighted. If the pilot then turns on the deicer, lamp 61 will be lighted in the same manner; and when he attempts to restart, lamp 63 will light.

However, if he tries to restart before deicing the results will be different. The restart input at line 51 will cause an output to gates 57 and 71 as described in connection with the input on 47. Counter 79 will advance to "2". Thus the output of block 77 will be connected through flasher mechanism 81 of FIG. 4 and lamp 63 will flash, indicating that the task has been performed out of sequence.

If the instructor has selected takeoff and input indicating a malfunction is not present on line 27, gate 31 will have an output going to AND gate 37. Its second input is the output of NOR gate 89 which is used to invert the output of gate 39. This assures that gate 37 will have an output only when gate 31 and not gates 31 and 29 have outputs.

The output of gate 37 enables gates 91, 93 and 95 which have as inputs signals from the computer indicating right magneto, left magneto, and power application on lines 97, 99 and 101, respectively. Operation from this point is as described above with one small difference. The order of checking magnetos is not critical but they must be checked before applying power for takeoff. To assure that the lights will not flash if the left - right order is reversed, a signal "B" is taken from the output of gate 37 and connected to the inputs of OR gates 64 and 60. The outputs from gates 64 and 60 are inputs to blocks 73, and 75 causing their outputs to be grounded. Thus, regardless of their order of performance a steady light will result. But if takeoff power is applied before both left and right are checked, counter 79 will not be a "3" and lamp 63 will flash.

In a similar manner gate 35 enables gates 103, 105 and 107 which have as their inputs, left rudder, stick left, and stick back on lines 109, 111, and 113. Operation is the same as described above except that all of these actions should happen about the same time. To avoid flashing, an output "A" from gate 35 is used to keep the outputs of blocks 73, 75 and 77 at ground using OR gates 60, 64 and 68.

Logic has been shown for only a few procedures of a few items. The same techniques may be used to expand the system. The logic of block 15 of FIG. 1 shown on FIG. 3 may also be embodied in digital computer 13 using programs to cause the logic elements in the computer to perform the desired functions.

Figure 5:
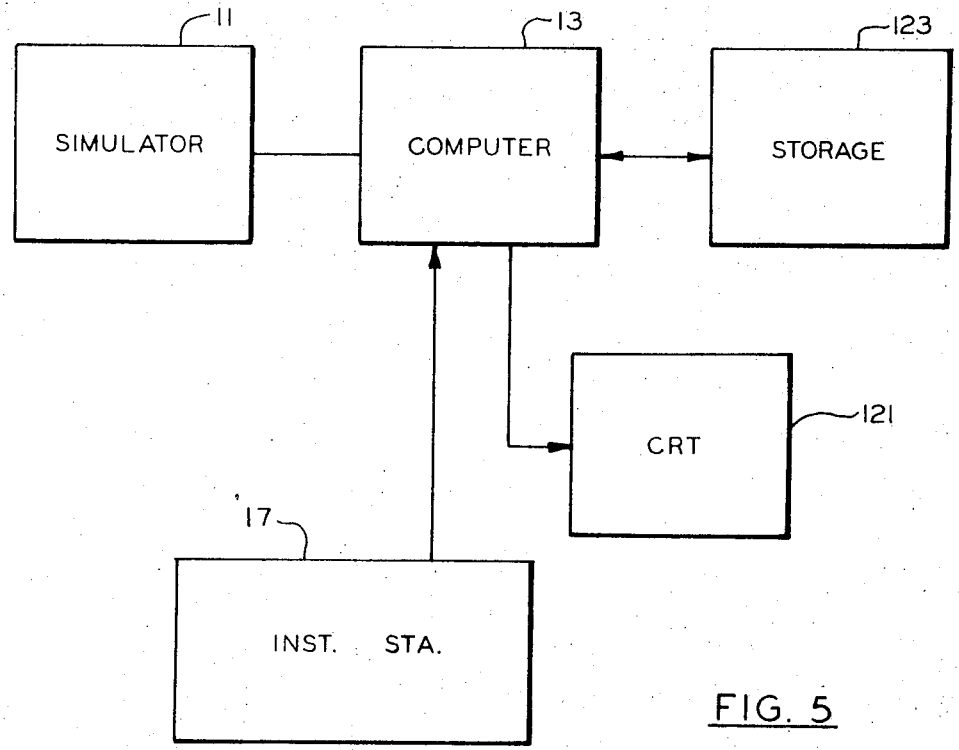
FIG. 5 is a block diagram of a second embodiment of the invention.

FIG. 5 shows a block diagram of a second embodiment of the invention. The relationship of simulator 11 and computer 13 is the same. Logic 15 of FIG. 1 is embodied in computer 13, and thus instructor station 17 is connected only to computer 13. The slide projector and screen are replaced by a CRT display 121 having, for example, an alphanumeric readout, and storage device 123. The information which as formerly stored on slides is now stored in storage 123 (this may be core storage or any other types of storage normally used with digital computers such as disk, tape etc.).

Figure 6A:
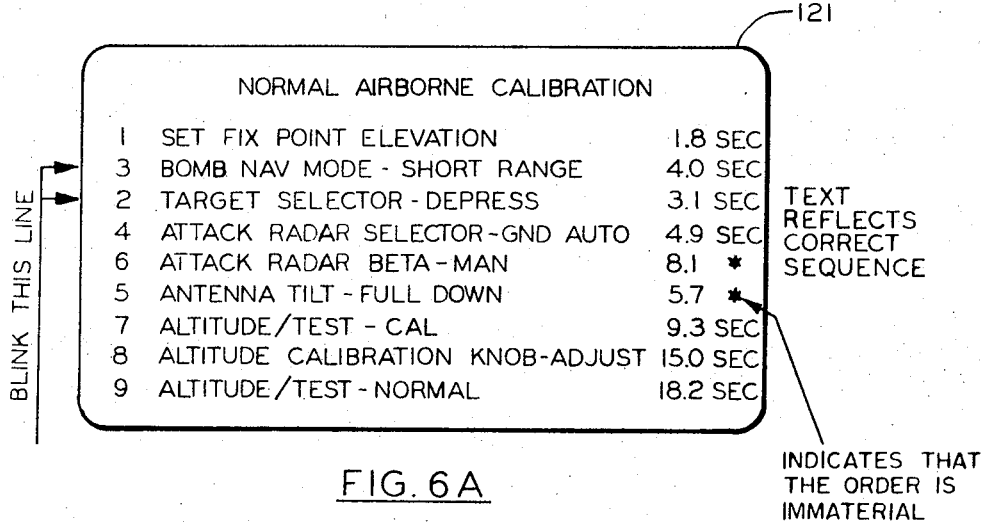
FIGS. 6a and 6b are views of the display associated with FIG. 5.

Two modes of operation are possible with this embodiment as will be explained in connection with FIGS. 6A and 6B. FIG. 6A shows a possible display on CRT 121 where the correct sequence of operation is displayed. In this mode, selection of the procedure shown (Normal Airborne Calibration) by the instructor would cause the stored information regarding the steps to be taken to be retrieved from memory and displayed. A timer would be started in the computer and as each step is performed the time and order of execution (from the start) displayed next to a description of the step. If steps are executed out of sequence, as indicated by lines 2 and 3, these lines will be made to blink or change in color so as to catch the attention of the instructor. The order is shown to be reversed on the left by the reversal of the numbers 2 and 3 and on the right the time of execution is shown. Lines 5 and 6 are also reversed but since their order is immaterial they will not be made to blink.

Figure 6B:
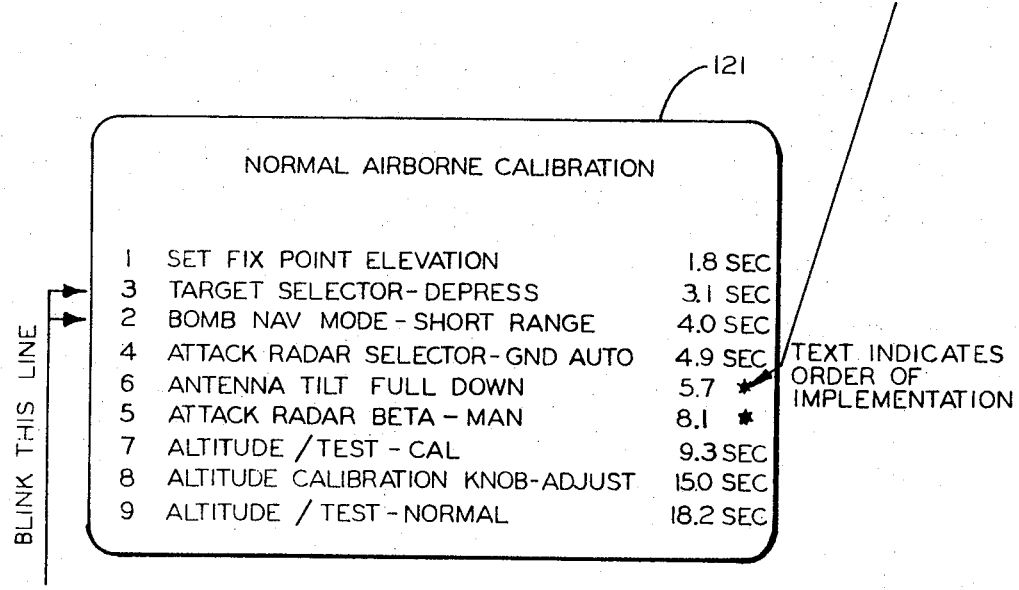

FIG. 6B shows a second mode of operation. In this case rather than display the correct order of steps to be taken, each step is retrieved from memory and displayed when it is executed. The numbers at the left now indicate the proper order rather than actual order of performance. Steps executed out of order will again be made to blink, change color, etc.

Thus, apparatus which will permit an instructor in a trainer to quickly and easily evaluate trainee performance during the execution of procedural items has been shown. Although specific embodiments have been shown the principles of the invention may be employed using many various logic combinations, both internal and external, to a digital computer.

What is claimed is:

1. In a trainer wherein electrical signals indicating trainee execution of procedural items is provided to and stored in an associated computer, apparatus to provide an instructor with a visual indication of the execution and order of said execution of procedural items by the trainee comprising:
   a. a display screen;
   b. means to select one of several procedural items to be displayed;
   c. a slide projector containing a plurality of randomly accessible slides each having tasks associated with one of said several items recorded thereon;
   d. means responsive to indications of trainee action stored in the computer and to said selection means to cause the slide having the tasks associated with the selected item to be retrieved from said random access projector and displayed on said screen;
   e. a plurality of indicator lights aligned with and corresponding to the displayed tasks, said lights being responsive to execution of a task by the trainee; and
   f. means to give a visual indication on said display screen of tasks executed in improper order.

2. In a trainer wherein electrical signals indicating trainee execution of procedural items is provided to and stored in an associated computer, apparatus to provide an instructor with a visual indication of the execution and order of said execution of procedural items by the trainee comprising:
   a. cathode ray tube display means;
   b. means operable by the instructor to select one of several procedural items to be displayed;
   c. digital storage means wherein a list of tasks associated with each of said several items is stored;
   d. means responsive to said selection means to retrieve and display on said cathode ray tube said tasks associated with said selected item in proper order of execution; and
   e. means responsive to execution of a task by a trainee to cause the time of execution to be displayed adjacent the associated task on said cathode ray tube.

3. The invention according to claim 2 and further including means to cause the displayed task and associated time to blink when a task is performed out of order.

4. The invention according to claim 2 and further including means to cause the displayed task and associated time to be displayed in a different color when a task is performed out of order.

5. In a trainer wherein electrical signals indicating trainee execution of procedural items provided to and stored in an associated computer, apparatus to provide an instructor with a visual indication of the execution and order of said execution of procedural items by the trainee comprising:
   a. cathode ray tube display means
   b. means operable by the instructor to select one of several procedural items to be displayed;
   c. digital storage means wherein a list of tasks associated with each of said several items is stored;
   d. means responsive to the execution of a task by the trainee to cause the tasks to be retrieved and displayed in the order of execution; and
   e. means to cause the time of execution to be displayed adjacent the display of each task.

6. The invention according to claim 5 and further including means to cause the displayed task and associate time to blink when a task is performed out of order.

7. The invention according to claim 5 and further including means to cause the displayed task and associated time to be displayed in a different color when a task is performed out of order.

* * * * *

UNITED STATES PATENT OFFICE
CERTIFICATE OF CORRECTION

Patent No. 3,745,671      Dated July 17, 1973

Inventor(s) Charles P. L. Mortimer

It is certified that error appears in the above-identified patent and that said Letters Patent are hereby corrected as shown below:

Column 1, first paragraph should read:

"The invention herein described was made in the course of or under a contract, or subcontract thereunder with the Department of the Air Force."

Signed and sealed this 30th day of April 1974.

(SEAL)
Attest:

EDWARD M. FLETCHER, JR.
Attesting Officer

C. MARSHALL DANN
Commissioner of Patents

FORM PO-1050 (10-69)